July 13, 1965

H. W. BOOK 3,195,084

ELECTRICAL APPARATUS HAVING FOIL WOUND
WINDINGS AND METALLIC DUCT FORMERS

Filed May 23, 1962

WITNESSES

INVENTOR
Herbert W. Book
BY
F. E. Browder
ATTORNEY

United States Patent Office 3,195,084
Patented July 13, 1965

3,195,084
ELECTRICAL APPARATUS HAVING FOIL WOUND WINDINGS AND METALLIC DUCT FORMERS
Herbert W. Book, Hickory Township, Mercer County, Pa., assignor to Westinghouse Electric Corporation, East Pittsburgh, Pa., a corporation of Pennsylvania
Filed May 23, 1962, Ser. No. 197,144
5 Claims. (Cl. 336—60)

This invention relates in general to duct formers for electrical coils and more particularly to metallic duct formers for foil wound electric coils.

Many materials have been used in the prior art to form cooling ducts in electrical coils. Corrugated sheets of fiber or metal and hard wood strips glued to sheets of supporting paper all have been utilized. Non-metallic duct forming materials have the disadvantage of being thermally insulating. Thus, they have a blanketing effect on the coil being cooled and impede rather than assist heat transfer from the coil to the cooling medium. Corrugated metal duct formers have the disadvantage of contacting the coil insulation at relatively sharp points. This tends to abrade the coil insulation at these points when the coil is subject to mechanical stress due to overload or short circuit.

Accordingly, it is the general object of this invention to provide a new and improved duct former for electrical coils.

It is a more particular object of this invention to provide a new and improved metallic duct former for foil wound electrical coils.

Yet another object of this invention is to provide a duct former for foil wound electrical coils that will aid in heat transfer.

Briefly, the present invention accomplishes the above cited objects by providing a metal duct former having flat surfaces to contact adjacent coils or to contact adjacent turns inside a foil wound coil. Ribs are used to hold the flat surfaces apart and substantially parallel. More specifically, by means such as the extension of a metal of high thermal conductively, such as aluminum, a duct former having flat surfaces of relatively large area spaced apart by stiff webs is obtained.

Further objects and advantages of the invention will become apparent as the following description proceeds and features of novelty which characterize the invention will be pointed out in particularly the claims annexed to and forming a part of this specification.

For a better understanding of the invention, reference may be had to the accompanying drawings in which.

Figure 1:
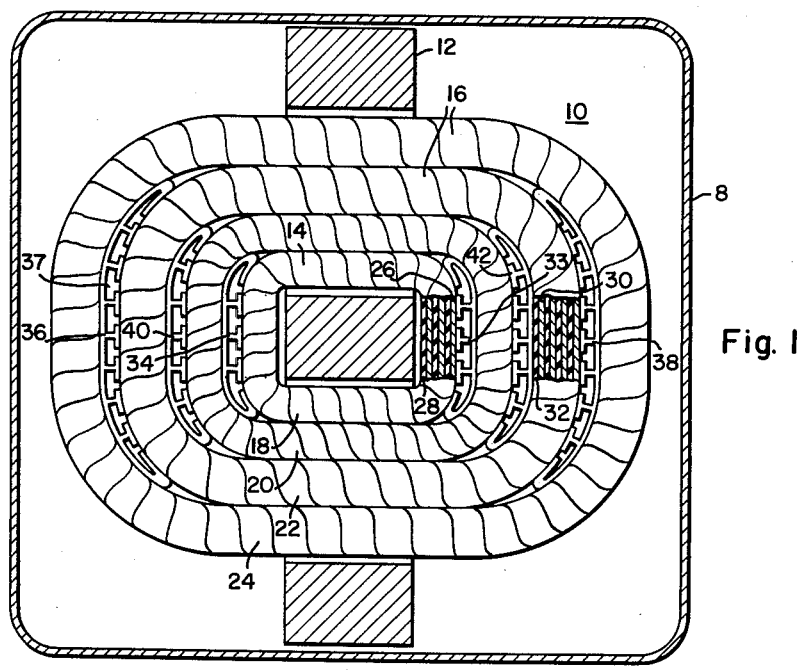
FIGURE 1 is a transverse sectional view of a transformer tank containing a foil wound transformer core and coil assembly using one embodiment of the invention.

Referring to FIG. 1 there is illustrated a transformer tank 8 suitable for holding a cooling fluid and a transformer core and coil assembly 10. It will be understood that the cooling fluid may be a liquid, a gas, or a mixture of gases. A magnetic core 12 is provided with a high voltage coil 14 and a low voltage coil 16. The high voltage coil 14 is subdivided into two sections 18 and 20. The low voltage coil 16 is likewise divided into two sections, 22 and 24. The high voltage winding 14 is comprised of alternate layers of metal foil 26 and electrical insulation 28. The low voltage winding 16 is also wound of alternate layers of metal foil 30 and electrical insulation 32. Metal duct formers 33 and 34 are used between the high voltage coil sections 18 and 20, permitting a cooling fluid to circulate to cool the transformer core and coil assembly 10. Between the low voltage coil sections 22 and 24, metal duct formers 36 and 38 are used. Metal duct formers 40 and 42 are used between the high voltage coil 14 and the low voltage coil 16. It is to be noted that the metal duct formers do not cause an electrical short circuit between the foil wound coil turns because the duct formers are so positioned as to contact metal foil with one surface and insulation with the other surface. For example, one side of duct former 33 is in contact with foil 26 of high voltage coil section 18, and the other side is in contact with the insulation surrounding high voltage coil section 20. It will be understood that the duct former may also be used with foils which are coated on both sides with insulation before winding. With the duct formers in place, ducts such as 37 are formed which permit a cooling fluid to flow through the coils. The ducts formers, such as 33, may be inserted in a coil or between coils, wherever cooling is desired in an electrical inductive apparatus.

Figure 2:
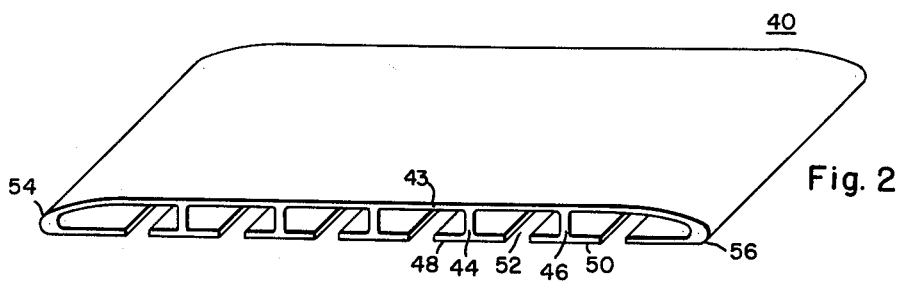
FIG. 2 is a perspective view of the embodiment of the invention used in FIG. 1.

The preferred embodiment of the invention is shown in FIG. 2. The duct former 40 is made of a metal, such as aluminum. The duct former 40 may be produced by a process such as extrusion. One side of the duct former 40 is a flat sheet 43. Webs such as 44 and 46 extend from flat sheet 43 at substantially right angles. The webs 44 and 46 are joined at their other end to flat strips, such as strips 48 and 50. The webs 44 and 46 are made strong enough to hold apart the surfaces being cooled. The strips such as 48 and 50 are separated by a gap 52. The ends 54 and 56 of the duct former 40 are made in a tapered shape to facilitate insertion between foils of a foil wound coil. It will be understood that the flat sheet side 43 of duct former 40 is intended to come in contact with electrical insulation. Electrical insulation is usually a poor thermal conductor and hence sheet 43 is of maximum surface area to provide better heat transfer between the duct former 40 and the electrical insulation. The strips such as 48 and 50 would in many applications of the invention be in contact with metal foil and, therefore, the strips such as 48 and 50 need be of sufficient width to make good thermal contact with the metal foil. It will be noted that the strips such as 48 and 50 are of sufficient width to prevent damage to the foil as the core and coil assembly 10 expands and contracts due to heating and cooling. The duct former 40 is flexible and may easily be bent to conform to curved coil shapes without materially deforming the ducts formed between the flat surface 43 and the flat strips such as 48 and 50. The duct former 40, being constructed of metal, functions as a heat sink and has a large surface area to dissipate heat.

Figure 3:
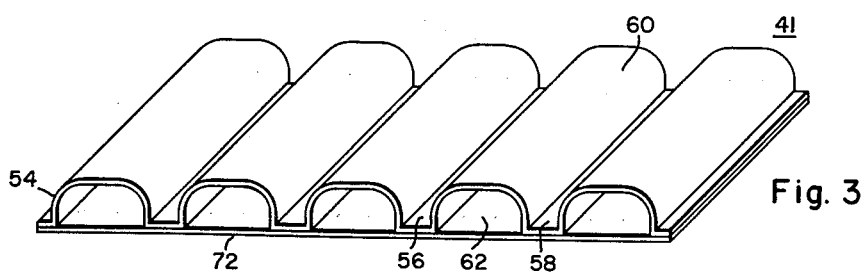
FIG. 3 is a perspective view of another form of the invention fabricated of two pieces of sheet metal.

Another embodiment of the invention is illustrated by FIG. 3. FIG. 3 illustrates a metallic duct former 41, in which a flat sheet of metal 72 and another piece of sheet metal 54, which has a transverse cross section roughly that of a series of rounded rectangles, are joined at intervals by a method such as welding. The sheet metal piece 54 may be formed by such methods as extrusion or stamping. Flat surfaces such as 56 and 58 are provided for attaching sheet metal piece 54 to the flat sheet metal piece 72. These flat surfaces also provide good thermal contact between the two pieces of sheet metal 72 and 54. Essentially flat surfaces such as 60 are provided in sheet 54, to make good thermal contact with the electrical winding to be cooled. These flat surfaces prevent damage to the winding by sharp points as the electrical winding expands and contracts due to heat cycling. It will be noted that when the sheets 72 and 54 are joined, ducts such as 62 are formed which will conduct a cooling fluid parallel to the longitudinal axis of the flat surfaces, such as 56 and 58. The duct former 41 is flexible and may be bent to fit the contour of the electrical coil being cooled without changing the shape of the ducts, such as duct 62. It will be noted that when the duct former 41 is used with the surfaces such as 60 in contact with a metal foil, additional ducts will be formed between the flat surfaces, such as 56 and 58, and the foil. The duct former 41 may be placed in the electrical apparatus being cooled in the same manner as the duct formers shown in FIG. 1. It is to be noted that the duct former 41 has a flat surface 72 on one side and a plurality of essentially flat surfaces such as 60 on the other side. Therefore if duct former 41 is used in contact with electrical insulation there are no sharp points to abrade such insulation. The duct former 41 has a relatively large surface area for dissipating heat, and hence will function as a heat sink.

It will, therefore, be apparent that there has been disclosed a duct former for foil wound electrical coils that aids in heat transfer by providing a plurality of ducts for coiling fluid flow and a large surface area.

Since numerous changes may be made in the above-described apparatus and different embodiments may be made without departing from the spirit thereof, it is intended that all the matter contained in the foregoing description or shown in the accompanying drawings shall be interpreted as illustrative and not in a limiting sense.

I claim as my invention:

1. A metal duct former for circulating a cooling fluid through foil wound electrical coils, said duct former comprising a flat sheet with a plurality of flat strips connected to said flat sheet by structural webs, said webs being substantially at right angles to both said flat sheet and to said flat strips, said flat strips being separated by air gaps from adjacent flat strips.

2. A transformer core and coil assembly having metal duct formers therein, said transformer core and coil being disposed in a tank, said tank containing a cooling fluid immersing said core and coil assembly, said duct formers comprising a sheet metal member, a plurality of flat strip metallic members, and a plurality of metallic web members, said flat strip members being held in spaced parallel relation with said sheet metal member by said web members, said web members disposed to hold said flat strip members in spaced relation with one another to form a plurality of gaps and provide a flexible structure, at least the side of each of said duct formers having the flat strip members being in contact with said transformer coil to form cooling ducts through said transformer.

3. An electrical coil for inductive apparatus comprising a plurality of turns formed from foil conductor; electrical insulating means separating said plurality of turns; a tank; cooling fluid disposed within said tank; said electrical coil being disposed within said tank and immersed in said cooling fluid; at least one metallic duct former disposed within said electrical coil for allowing said cooling fluid to circulate through said coil; said duct former comprising a metallic structure which has a substantially flat sheet member, a plurality of substantially flat strip members, and a plurality of rigid web members; said plurality of strip members being held in spaced parallel relation with said sheet member by said web members; said web members spacing said strip members from one another to form a plurality of openings between said members which allows said duct former to be flexed to conform to curved coil surfaces.

4. An electrical coil for inductive apparatus comprising a plurality of turns formed from coil conductor having a coating of electrical insulating material disposed thereon; a tank; cooling fluid disposed within said tank; said electrical coil being disposed within said tank and immersed in said cooling fluid; at least one metallic duct former disposed between predetermined turns of said electrical coil for allowing said cooling fluid to circulate through said coil; said duct former comprising a metallic structure which has a substantially flat sheet member, a plurality of substantially flat strip members, and a plurality of rigid web members; said plurality of strip members being held in spaced parallel relation with said sheet member by said web members; said web members spacing said strip members from one another to form a plurality of openings between said strip members which allows said duct former to be fixed to conform to curved coil surfaces.

5. An electrical coil for inductive apparatus comprising a plurality of turns formed from foil conductor; electrical insulating means separating said plurality of turns; a tank; cooling fluid disposed within said tank; said electrical coil being disposed within said tank and immersed in said cooling fluid; at least one metallic duct former disposed within said electrical coil for allowing cooling fluid to circulate through said coil; said duct former comprising a metallic structure which has a substantially flat sheet member, a plurality of substantially flat strip members, and a plurality of rigid web members; said plurality of strip members being held in spaced parallel relation with said sheet member by said web members; said web members spacing said strip members from one another to form a plurality of openings between said strip members which allows said duct former to be flexed to conform to curved coil surfaces; said duct former being disposed between said foil conductor and said electrical insulating means with said strip members contacting said foil conductor to allow said cooling fluid to directly contact said foil conductor.

References Cited by the Examiner

UNITED STATES PATENTS

| | | | |
|---|---|---|---|
| 667,996 | 2/01 | Schwedtmann et al | 336—60 |
| 2,710,947 | 6/55 | Gaston | 336—60 |
| 3,028,566 | 4/62 | Camilli | 336—60 |
| 3,046,509 | 7/62 | Wuckowski | 336—207 |

LARAMIE E. ASKIN, *Primary Examiner.*

JOHN P. WILDMAN, JOHN F. BURNS, *Examiners.*